(12) United States Patent
Vimme

(10) Patent No.: US 7,949,964 B2
(45) Date of Patent: May 24, 2011

(54) SYSTEM AND METHOD FOR VISUALIZATION OF NODE-LINK STRUCTURES

(75) Inventor: Eirik Vimme, Oslo (NO)

(73) Assignee: Computer Associates Think, Inc., Islandia, NY (US)

( * ) Notice: Subject to any disclaimer, the term of this patent is extended or adjusted under 35 U.S.C. 154(b) by 1832 days.

(21) Appl. No.: 10/849,698

(22) Filed: May 20, 2004

(65) Prior Publication Data

US 2007/0018983 A1    Jan. 25, 2007

Related U.S. Application Data

(60) Provisional application No. 60/474,324, filed on May 29, 2003.

(51) Int. Cl.
*G06F 3/048* (2006.01)

(52) U.S. Cl. ........ 715/853; 715/734; 715/739; 715/848; 715/854; 707/797

(58) Field of Classification Search .................. 715/734, 715/739, 853, 848, 854; 707/797
See application file for complete search history.

(56) References Cited

U.S. PATENT DOCUMENTS

| | | | | |
|---|---|---|---|---|
| 5,333,254 | A * | 7/1994 | Robertson | 715/853 |
| 5,590,250 | A | 12/1996 | Lamping et al. | 395/127 |
| 5,926,180 | A * | 7/1999 | Shimamura | 715/739 |
| 6,151,595 | A * | 11/2000 | Pirolli et al. | 707/1 |
| 6,628,304 | B2 * | 9/2003 | Mitchell et al. | 715/734 |

OTHER PUBLICATIONS

Ka-Ping Yee et al: "Animated Exploration of Dynamic Graphs with Radial Layout" proceedings of the IEEE symposium on information visualization Oct. 22, 2001, pp. 43-50, XP002310397.
Wilson R M et al: "Dynamic Hierarchy Specification and Visualization" Information visualization, 1999. (Info Vis'99). Proceedings. 1999 IEEE Symposium on San Francisco, CA, USA Oct. 24-29, 1999, Los Alamitos, CA, USA, IEEE Comput. Soc, 65-72 XP010356937 ISBN: 0-7695-0431-0 the whole document.
Lamping J et al. Association for computing machinery: "A focus+context technique based on hyperbolic geometry for visualizing large hierarchies" Human factors in computing systems. Chi'95 Conference proceedings. Denver, May 7-11, 1995, Conference on human factors in computing systems, New York, ACM, US, May 7, 1995, p. 401-408 XP00538470 ISBN:0-201-84705-1 the whole document.
Herman I, Melacon G, Marshall M: "Graph visualization and navigation in information visualization: A survey" IEEE Transactions on visualization and computer graphics, vol. 6, No. 1, Jan. 2000, pp. 24-43, XP002310399 the whole document.
Jankum-Kelly T J, Ma K L: "Focus+Context Display of the Visualization Process" Technical report CSE-2002-13, 2002, pp. 1-8, XP002310398 University of California Davis, section 2.2, section 4.2.

* cited by examiner

*Primary Examiner* — William L Bashore
*Assistant Examiner* — Sherrod Keaton
(74) *Attorney, Agent, or Firm* — Baker Botts L.L.P.

(57) ABSTRACT

A method of visualizing a node-link structure includes determining a radius for at least one level of a circular tree obtaining data identifying a first node within the node-link structure, determining a first position of the first node, the first position being a center of the circular tree, wherein the radius of the at least one level is measured from the center of the circular tree and determining positions of any children nodes of the first node and drawing the children nodes on a first level of the at least one level of the circular tree along the determined radius.

36 Claims, 8 Drawing Sheets

SYSTEM AND METHOD FOR VISUALIZATION OF NODE-LINK STRUCTURES This application is based on and claims the benefit of Provisional Application Ser. No. 60/474,324 filed May 29, 2003, entitled SYSTEM AND METHOD FOR VISUALIZATION OF NODE-LINK STRUCTURES, the entire contents of which are herein incorporated by reference.

BACKGROUND OF THE DISCLOSURE

1. Field of the Disclosure

The present disclosure relates generally to node-link structures and in particular, to the visualization of node-link structures.

2. Description of the Related Art

A node-link structure, as the name implies, includes nodes and links. Each link relates to two or more nodes. There are various types of graphs which are node-link structures in which each link relates two nodes. In a directed graph, each link indicates a direction between a source node and a destination node. An acyclic directed graph is a graph in which when the links are followed in their indicated directions, they do not provide a path from any node back to itself. A tree is an acyclic directed graph with one root node and one or more non-root nodes. When the links in the tree are followed, only one path is provided that begins at the root node and leads to the non-root node.

The children of a node are the nodes that can be reached by following a link in its indicated direction. The parent of a node is a node that can be reached by following the link in the opposite direction. The descendants of a node include all of its children, the children of the children (grandchildren), etc. The ancestors of a node include all of its parents, the parents of its parents (grandparents), etc. The siblings of a node include all other children of its parent.

A tree can also be viewed as a structure in which each node in the tree is "attached" to one or more elements beneath it by the links. The various nodes and links forming the descendants of a node can be referred to as a branch. Because a tree is often displayed inverted with the root at the top, it can be referred to as an inverted tree. Inverted trees are often used to represent hierarchical structures and can be referred to as hierarchical trees. Inverted trees can be used to represent various types of information. For ease in description, the present disclosure generally refers to examples utilizing file systems, such as hierarchical file systems. Of course, the present disclosure is not limited to this type of information.

An example of a hierarchical file system is shown in FIG. 1. FIG. 1 depicts, for example, a Windows hierarchical file system for a "C" drive of a computer system. As shown, the Windows display includes folder "BDE" 2, folder "XYZ" 4 and folder "Documents and Settings" 6. Documents and Settings folder 6 may include an "Administrator" folder 8, an "All Users" folder 10 and a folder "XXXX" 12. Folder "XXXX" 12 may include a folder "Cookies" 14, a folder "Desktop" 16 and folder "My Documents" 18. The "My Documents" folder 18 might include File 1, File 2, File 3, File 4 and File 5. File 4 might include documents Doc1 and Doc2. The boxes adjacent each folder can be left clicked on to expand or contract a file, show more or less of the folders/documents in the file. Since not all of the files may be capable of being viewed at one time, vertical scrollbar 20 is provided for scrolling up or down the file system, allowing the user to view different portions of the file system as they desire. Another way of visualizing a hierarchical file system is shown in FIG. 2.

FIG. 2 depicts the hierarchical file system of FIG. 1 presented in a hierarchical tree format. Each file or document can be represented as a node. As shown, in this example, the root node of the tree (Local Disk C) is at the top and the files (non-root nodes) are branched therefrom by links. Of course, there can be various ways of displaying the tree, depending on the information desired to be viewed. For example, any node in the tree can be selected as the root node which can be displayed at the top of the tree, with any nodes below it being considered the non-root nodes.

Although such a tree format provides a view of the files in a relatively easy to understand form, due to the expanding nature of the files at the bottom of the tree, it would be difficult to display many nested files at the same in a relatively small area.

SUMMARY

A method, apparatus and computer recording medium including computer executable code are disclosed for visualizing a node-link structure. The method comprises determining a radius for at least one level of a circular tree, obtaining data identifying a first node within the node-link structure, determining a first position of the first node, the first position being a center of the circular tree, wherein the radius of the at least one level is measured from the center of the circular tree and determining positions of any children nodes of the first node and drawing the children nodes on a first level of the at least one level of the circular tree along the determined radius.

The computer recording medium comprises code for determining a radius for at least one level of a circular tree, code for obtaining data identifying a first node within the node-link structure, code for determining a first position of the first node, the first position being a center of the circular tree, wherein the radius of the at least one level is measured from the center of the circular tree and code for determining positions of any children nodes of the first node and drawing the children nodes on a first level of the at least one level of the circular tree along the determined radius.

The apparatus comprises a system for obtaining data identifying a first node within the node-link structure and a processor for determining a radius for at least one level of a circular tree, the processor determining a first position of the first node, the first position being a center of the circular tree, wherein the radius of the at least one level is measured from the center of the circular tree, and the processor determining positions of any children nodes of the first node and drawing the children nodes on a first level of the at least one level of the circular tree along the determined radius.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
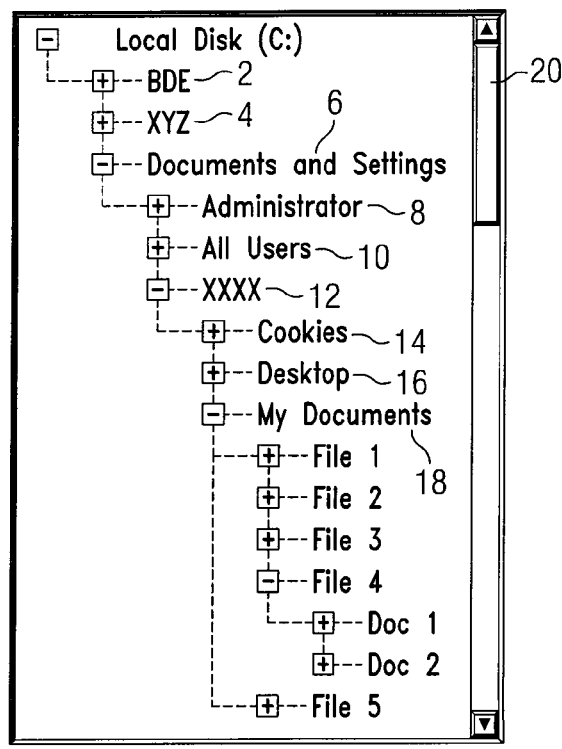
FIG. 1 is a diagram showing a hierarchical file system.

In describing preferred embodiments of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

The system and method of the present disclosure may be implemented in the form of a software application running on a computer system, for example, a mainframe, personal computer (PC), handheld computer, server etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

Figure 10:
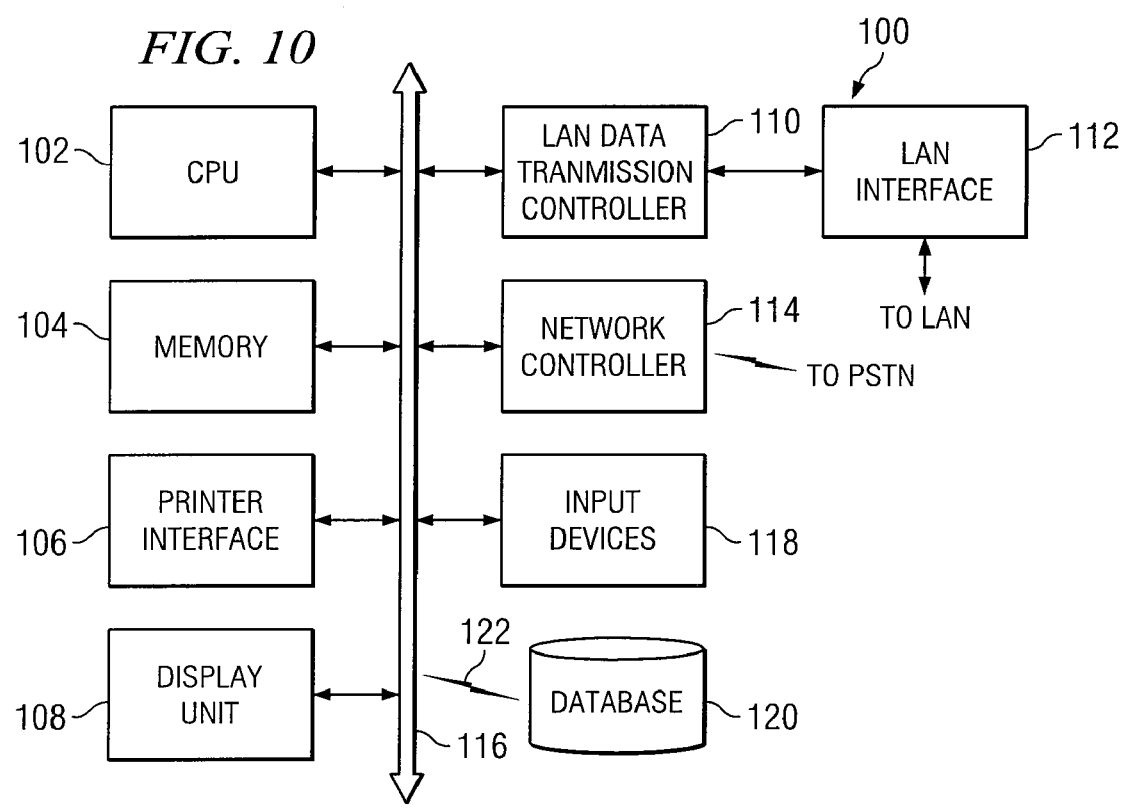
FIG. 10 is a block diagram of a computer system capable of implementing various aspects of the present disclosure.

An example of a computer system capable of implementing the present method and system is shown in FIG. 10. The computer system referred to generally as system 100 may include a central processing unit (CPU) 102, memory 104, for example, Random Access Memory (RAM), a printer interface 106, a display unit 108, a (LAN) local area network data transmission controller 110, a LAN interface 112, a network controller 114, an internal bus 116 and one or more input devices 118, for example, a keyboard, mouse etc. As shown, the system 100 may be connected to a data storage device, for example, a hard disk, 120, via a link 122.

According to an embodiment of the present disclosure, a hierarchical file can be displayed in a "fantree" format. A "fantree", according to an embodiment of the present disclosure, is a tree that spans circularly. The fantree may be a full 360 degrees or a portion thereof, and does not exceed a given diameter, regardless of the number of nodes in the tree.

Figure 3:
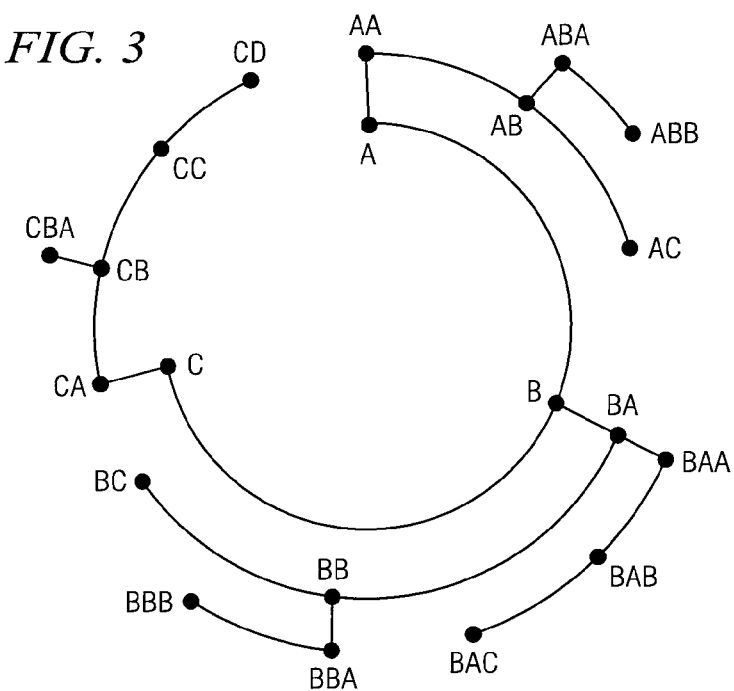
FIG. 3 is an example for explaining various aspects of a fantree according to an embodiment of the present disclosure.
Figure 2:
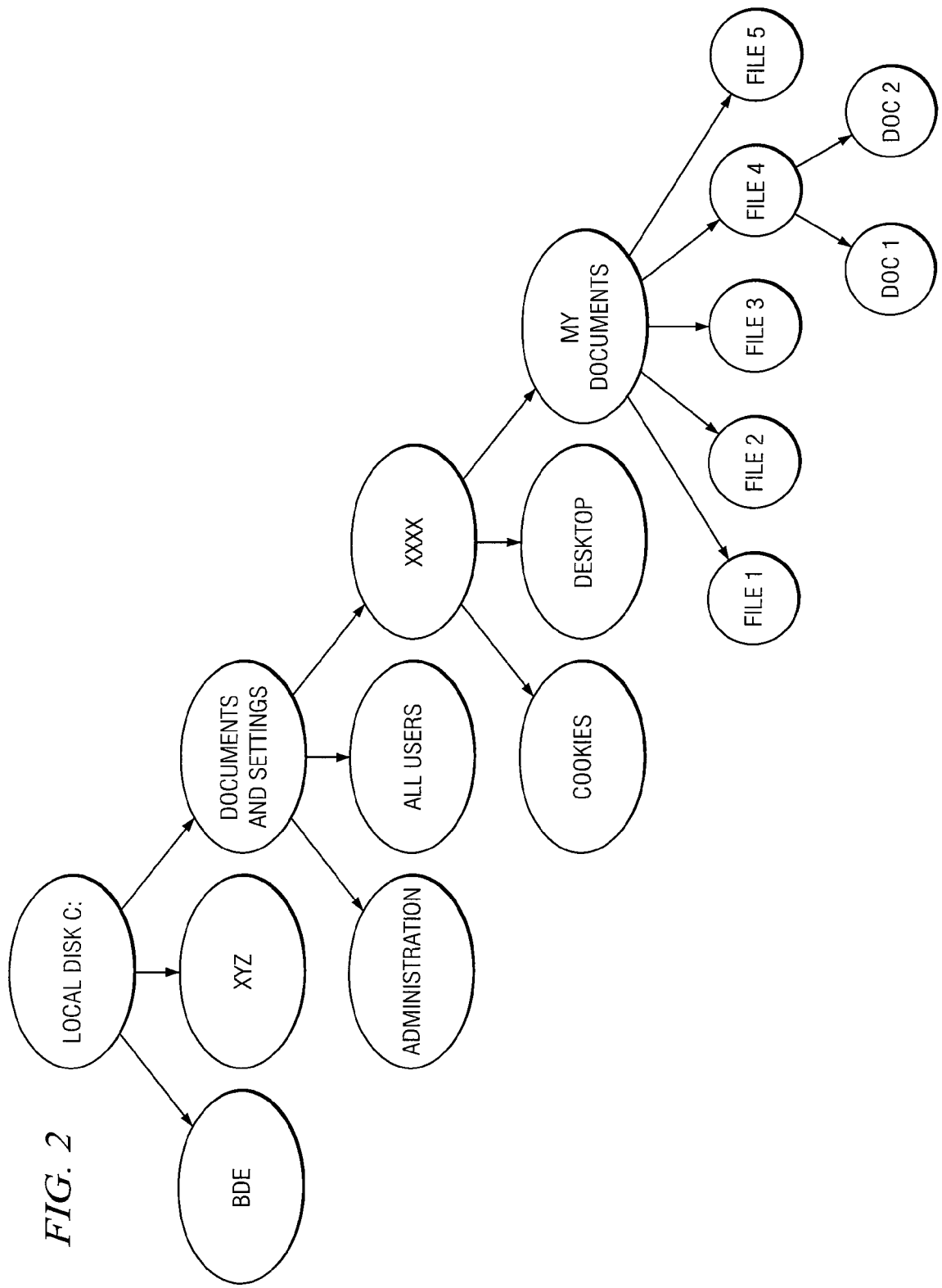
FIG. 2 is a diagram showing the hierarchical file system shown in FIG. 1 in a hierarchical tree format.

FIG. 3 shows an embodiment of a fantree for explaining various aspects of the present disclosure. In this embodiment, the fantree spans clockwise starting from the top. Of course, the fantree could span from any position or direction as desired. In addition, the rootnode is not displayed in this embodiment, although it could be displayed in, for example, the center of the fantree.

The fantree in this embodiment has three levels. The rootnode, although not shown in this embodiment, includes three child nodes (A, B and C) which are arranged circularly on level 1. Node A includes three of its own child nodes (AA, AB and AC) arranged circularly on level 2. Node AB in turn includes two of its own child nodes (ABA and ABB) arranged circularly on level 3. Node B includes three child nodes (BA, BB and BC). Node BA includes child nodes (BAA, BAB and BAC). Node BB includes two child nodes (BBA and BBB). Node C includes four child nodes (CA, CB, CC and CD). Node CB includes a child node CBA.

Figure 4:
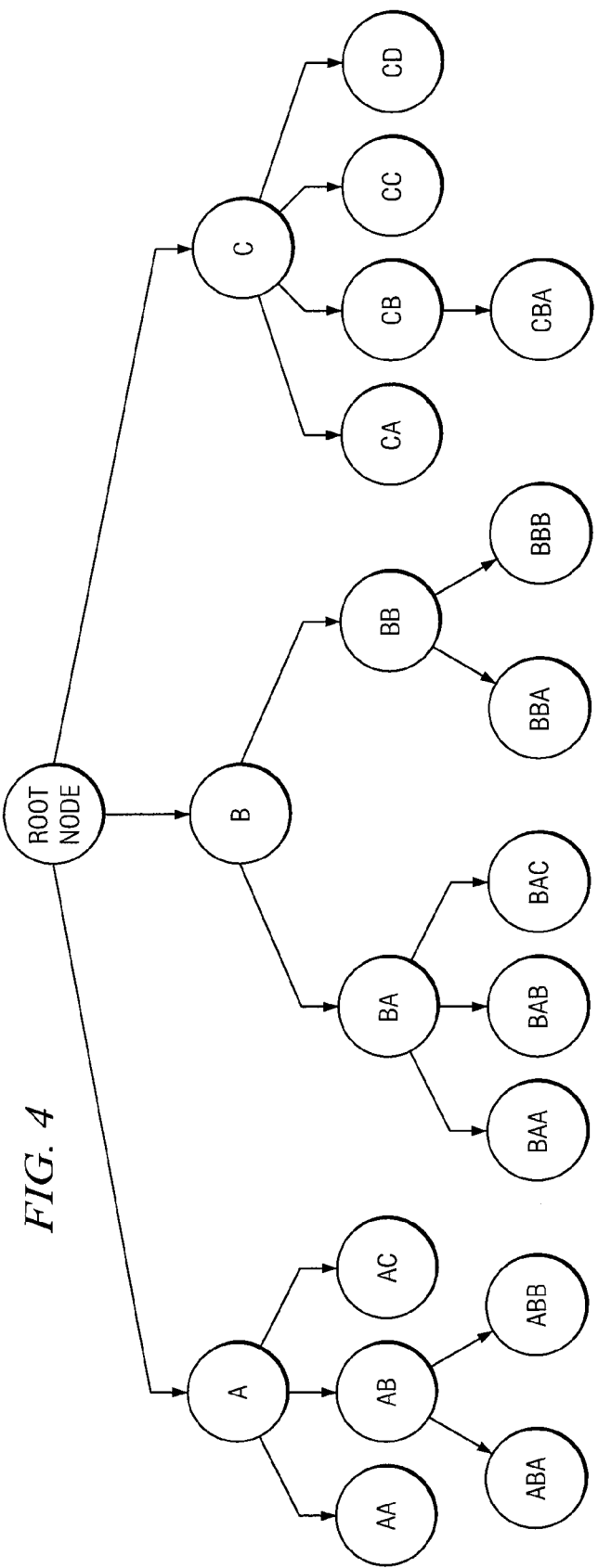
FIG. 4 is a diagram showing the fantree file system shown in FIG. 3 in a hierarchical tree format.

The same file system can be represented in a hierarchical tree format as shown in FIG. 4. As shown by a comparison of FIGS. 3 and 4, the fantree representation depicted in FIG. 3 is more compact than the hierarchical tree format depicted in FIG. 4, allowing more information to be displayed at one time in a smaller area.

According to an embodiment of the present disclosure, the fantree is constructed so that it spans a full 360 degrees, making room when a node is expanded and closing in when a node is collapsed.

To give the fantree a proper span and still avoid the fantree from falling out of range (e.g., having a radius bigger than 1 at any level), the radius of each level can be found by subtracting a proper fraction from 1 (e.g., (1−f)). The fraction (f) (referred to herein as a subtraction factor) is a descending number less than one. According to an embodiment of the present disclosure, (f) is a value less than one that decreases logarithmically toward zero when there is an increase of level (L) (L being an integer).

An equation satisfying this is:

$$f = (e)^L \qquad (1)$$

where $0<e<1$ and $1 \leq L$ is a valid assumption.

The estimate e in the equation (1) is a number that should be between zero and one. It should also be a number such that when the number of levels (H) in the tree increases (e.g., when the tree is expanded with nodes at a higher level than the present highest level displayed), e should increase leaving a smaller radius for each level in the tree.

The following equation may be used:

$$e = 1/b \qquad (2)$$

where $1<b$ would give $0<e<1$, and $$b = 1 + 2/H \qquad (3)$$

where $1 \leq H$ makes an appropriate value for increasing e (decreasing b towards 1) when H increases (H being an integer).

This leaves an equation for a subtraction factor:

$$f = (e)^L = (1/b)^L = (1/(1+2/H))^L \qquad (4)$$

and therefore, a radius r for each level can be calculated:

$$\text{radius } (r) = 1 - f = 1 - (1/(1+2/H))^L \qquad (5)$$

where $1 \leq L \leq H$.

Figure 5:
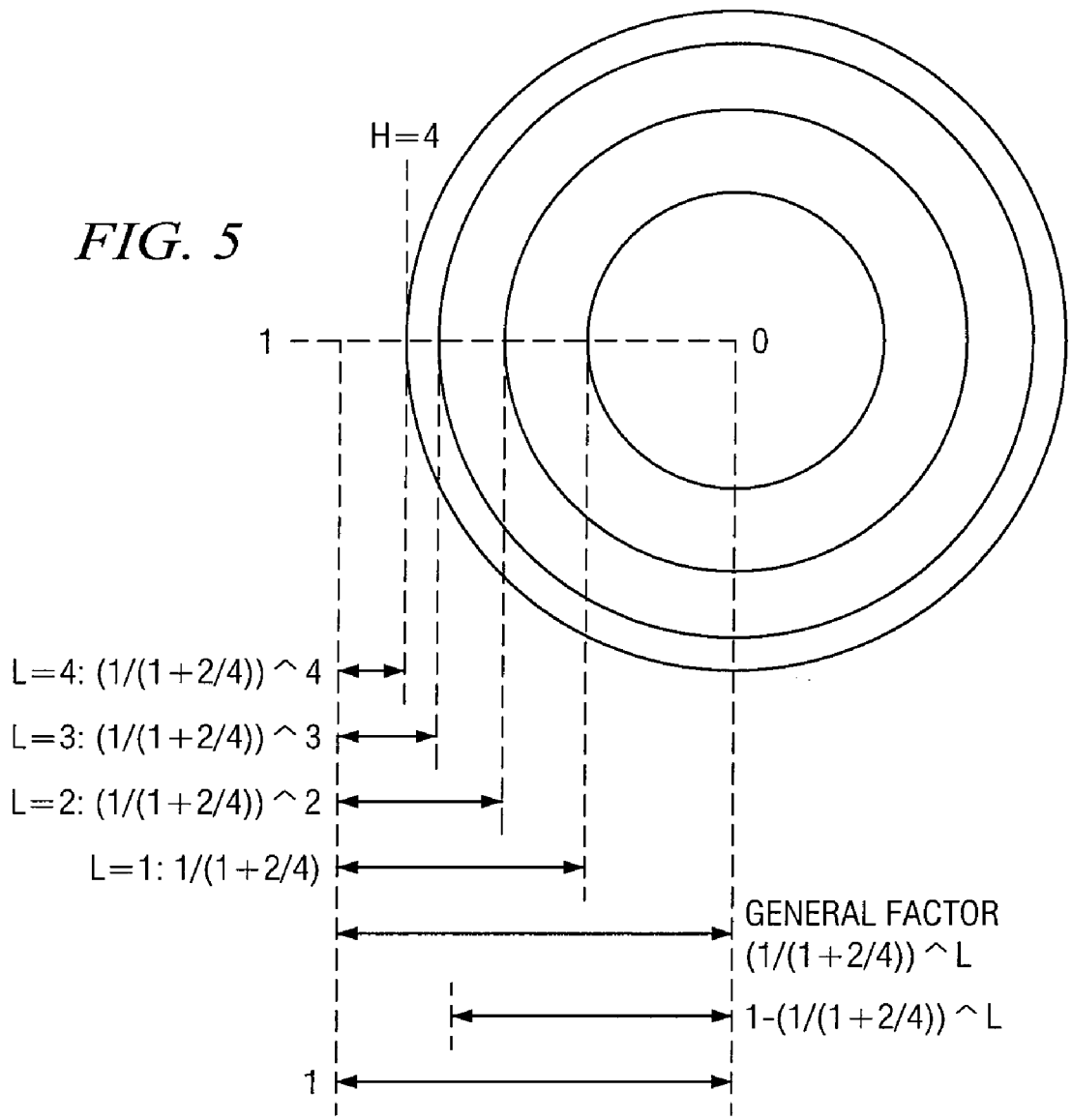
FIG. 5 is a diagram for explaining various aspects of determining the radius of the levels of a fantree.

FIG. 5 shows calculations of the radius for a tree with four node levels (H=4), utilizing equation (5). As shown, the difference in the radius of the levels decrease the further from the center of the tree.

The following procedures involve determining the positioning of the nodes. The goal is to determine the angular position of each node so that the fantree can be drawn. The first step is to determine the Node Sizes of each of the nodes. The Node Size of a node is a relative distance from that node to the next sibling node on a given level. As will be described in more detail below, the Node Size of a node will be either a calculated node size (CNS) or a sum of the Node Sizes (SAS) of its child nodes, depending on which is larger (Node Size =Max (CNS, SAS)). More specifically, by performing a "bottom-up" traversal of the fantree, the CNS of each node is determined. The CNS of each node is then compared with the sum of the Node Sizes of its children nodes (SAS), with the larger of these two values being used as the Node Size of the node. After the Nodes Sizes are determined for all of the nodes in the tree, the Treesize can be determined. The Treesize is the sum of the Node Sizes of the child nodes of the root node. The angular size or position of each of the nodes can then be determined.

For example, knowing that the circumference is proportional to the radius (Circumference =2PI*r), and using the radius formula (5) above, the calculated node size (CNS) can be determined for each node, using the formula:

$$CNS=1/radius=1/(1-(1/(1+2/H))^L) \quad (6)$$

As mentioned above, the size of the entire fantree (treesize) is the sum of the Node Sizes of the child nodes of the rootnode. The angular increase from one node to the next node (angular node size) when drawing the nodes of the tree is therefore:

$$2*PI*nodesize/treesize, \text{ in radians.} \quad (7)$$

Figure 6:
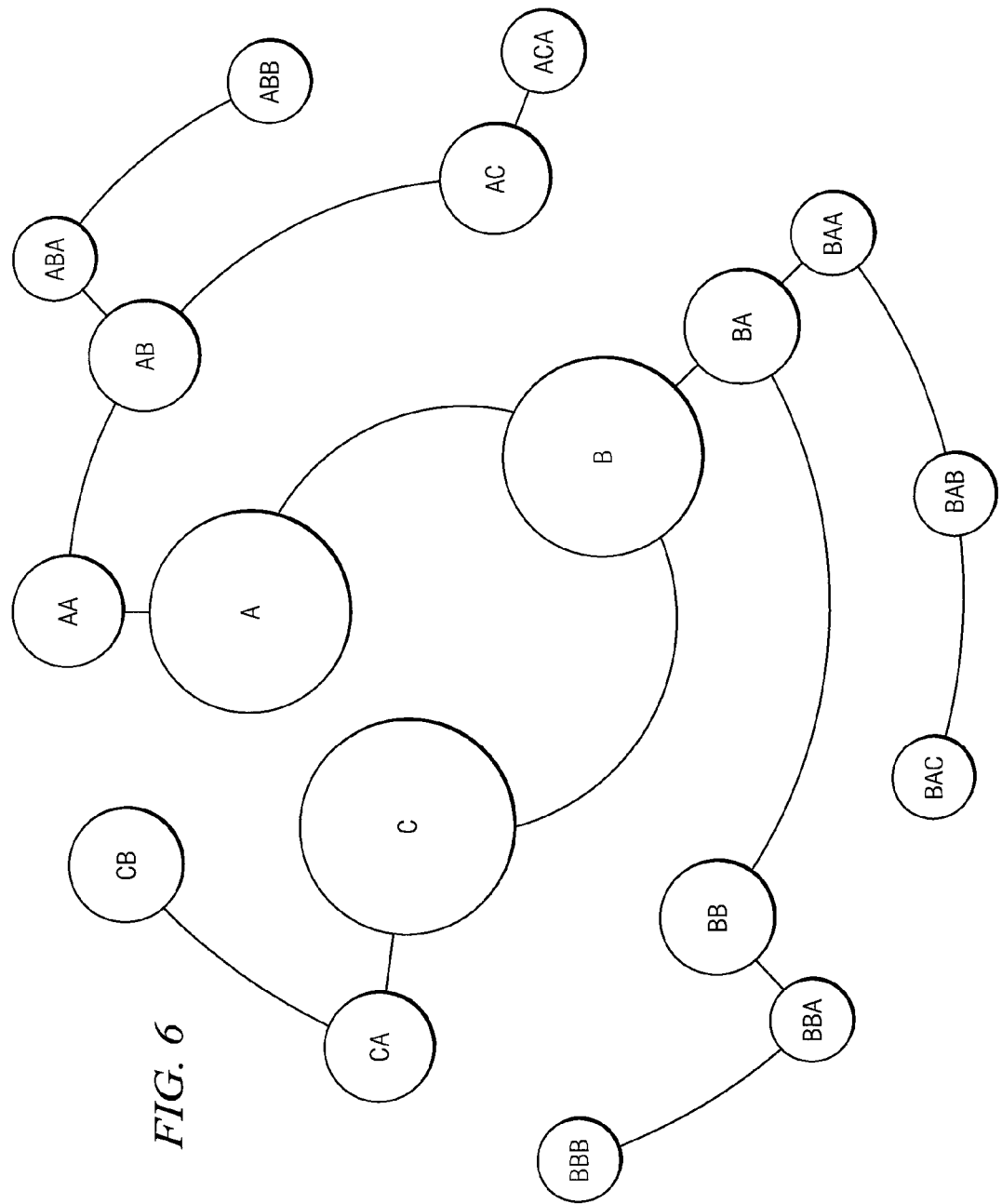
FIG. 6 is a diagram of a fantree according to an embodiment of the present disclosure.
Figure 8:
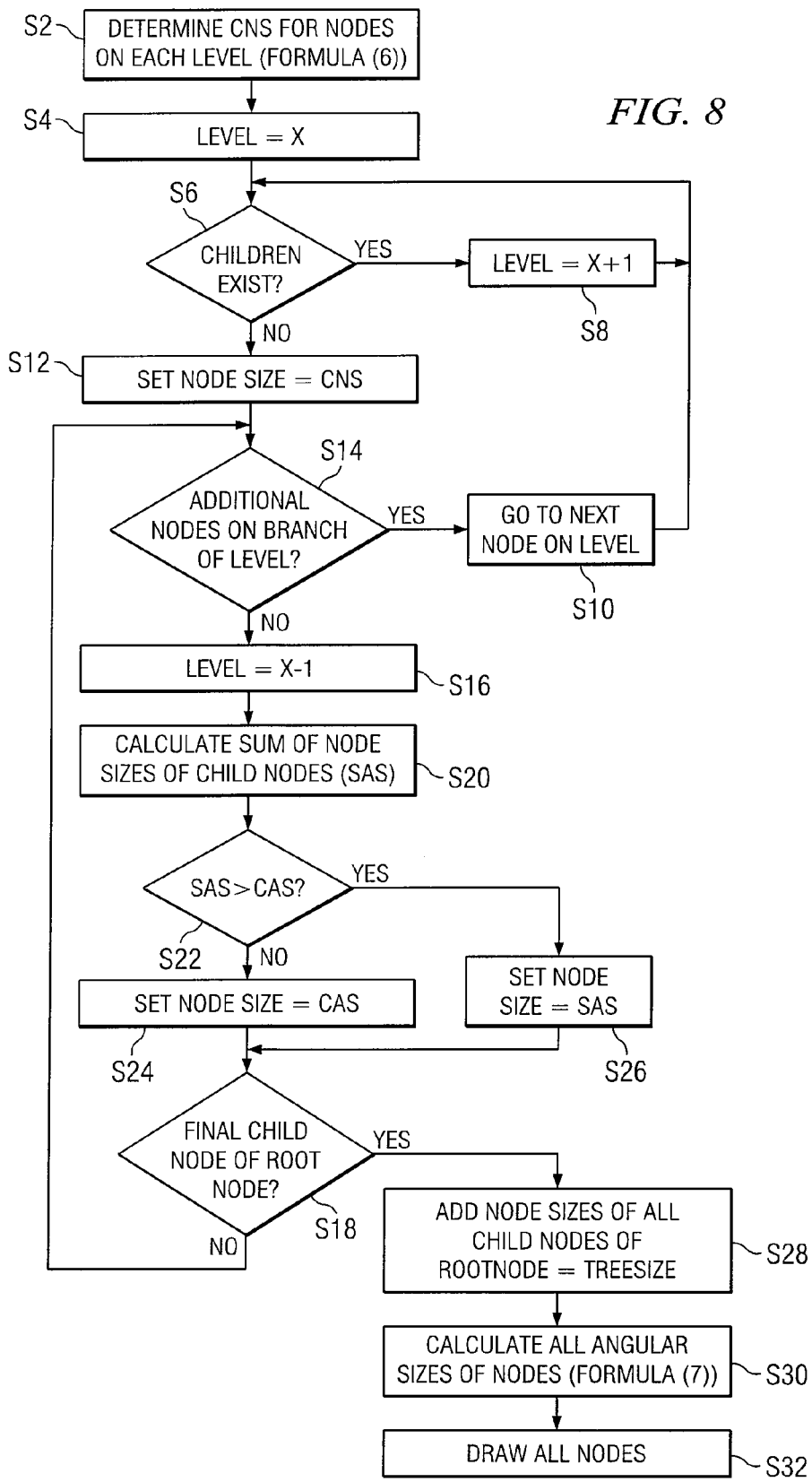
FIG. 8 is a flow chart for describing a method of drawing a fantree according to an embodiment of the present disclosure.

FIG. 6 is a diagram of a fantree for describing a system for drawing a fantree according to an embodiment of the present disclosure. As described herein, drawing refers to representing the fantree and includes, but is not limited to, at least one of printing and displaying the fantree. The actual diameters of the nodes illustrated in FIG. 6 are based on the level on which the node exists. As mentioned above, the "size" of a node as used herein refers to the relative distance from that node to the next node on a given level. A nodes "angular size" refers to the angle from that node to the next node on a given level. FIG. 8 is a flow chart for describing a system and method for drawing the fantree according to an embodiment of the present disclosure.

Figure 7:
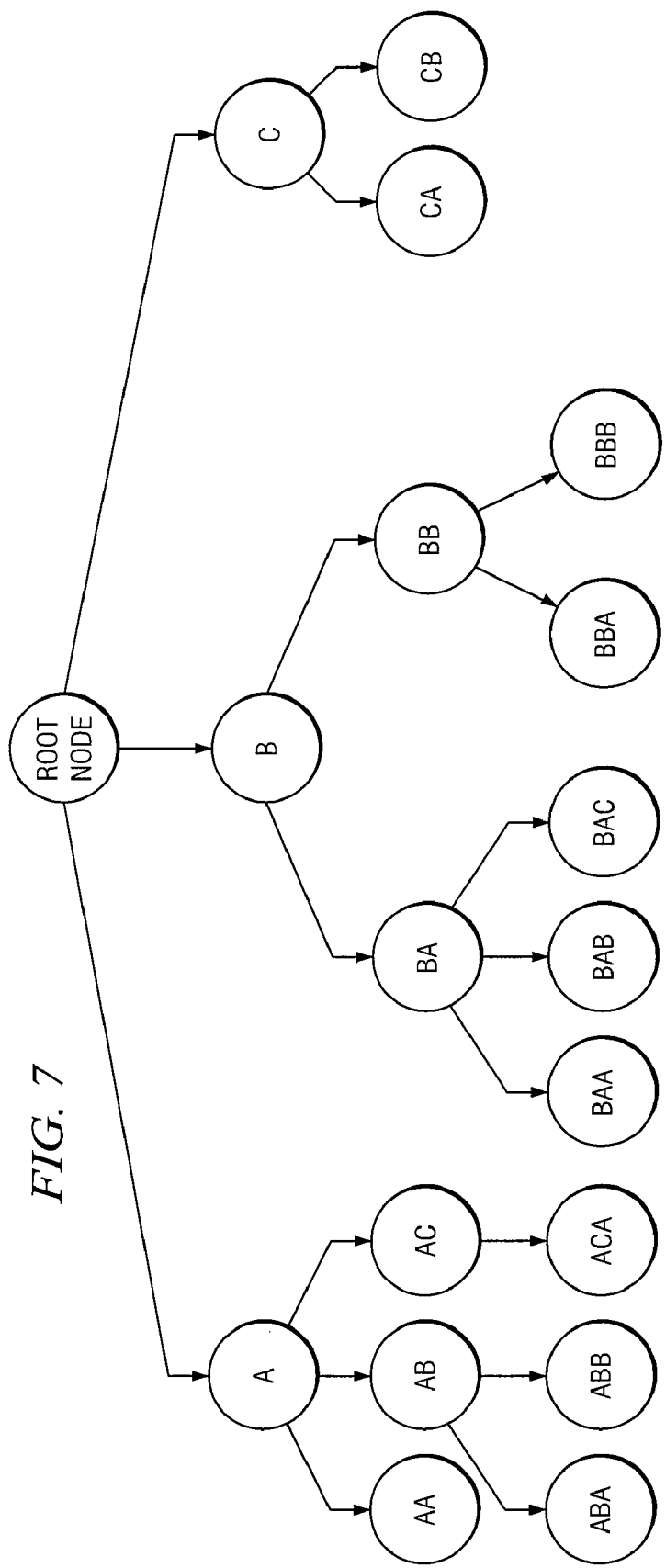
FIG. 7 is a diagram showing the fantree of FIG. 6 in a hierarchical tree format.

In the fantree shown in FIG. 6, three levels are shown; level 1, level 2 and level 3. In this embodiment, the root node is not displayed. FIG. 7 shows the same tree in hierarchical format. As shown in FIG. 7, the root node includes three child nodes A, B and C on level 1. Node A has three child nodes AA, AB and AC. Node B has two child nodes BA and BB. Node C has two child nodes CA and CB. Nodes AA, AB, AC, BA, BB, CA and CB are on level 2. Node AB has two child nodes ABA and ABB. Node AC has one child node ACA. Node BA has three child nodes BAA, BAB and BAC. Node BB has two child nodes BBA and BBB. Nodes ABA, ABB, ACA, BAA, BAB, BAC, BBA and BBB are on level 3.

A brief overview of a method of drawing or painting the fantree depicted in FIG. 6, according to an embodiment of the present disclosure, will now be described.

It will be appreciated from formula (6) that the CNS for each node is a function of the total number of levels and the level on which the nodes is on. The first step is to determine the CNS for each node on each level. It should be noted that the CNS for each node on a given level will be the same and the CNS decreases for each level away from the root node. The next step is to determine for each node the sum of the Node Sizes of its child nodes (SAS). The Node Size of each node (Node Size=Max (CNS, SAS)) may then be determined by performing a bottom up traversal of the tree.

FIG. 8 is a more detailed flow chart for describing the processing used to determine the node positions for drawing the fantree depicted in FIG. 6, according to an embodiment of the present disclosure. The calculated node size (CNS) of the nodes on each level are determined utilizing formula (6) above (Step S2). The value "level" is set to 1 (Step S4), representing the first level and the first node (node A) is examined. In Step S6, a determination is made whether node A has any child nodes. Since node A has at least one child node (Yes, Step S6), the level is increased by one to the second level (Step S8) and node AA is examined. Node AA has no children (SAS =0) (No, Step S6). Accordingly, node AA's Node Size is set to its CNS (Step S12) and it is determined if there are any additional nodes on this branch of the second level (Step S14). Since there are additional nodes on this branch of the second level (Yes, Step S14), the next node on that level (node AB is examined (Step S10). A determination is then made whether node AB has any children (Step S6). Since node AB has children (Yes, Step S6), the level is incremented by one to level 3 (Step S8) and it is determined whether node AVA has any children. Since node ABA has no children (No, Step S6), node ABA's Node Size is set to its CNS (Step S12) and it is determined if there are additional nodes on this branch of level 3 (Yes, Step S14). Node ABB is then examined (Step S10). Node ABB has no children (No, Step S6). Node ABB's Node Size is thus set to its CNS (Step S12). There are no additional nodes on this branch of level 3 (No, Step S14). The level is thus decremented to level 2 (Step S16), returning to node AB. The Sum of Node Sizes of AB's child nodes is calculated (Step S20) by adding ABA's Node Size and ABB's Node Size. In this case, SAS is greater than CAS for node AB (Yes, Step S22) and AB's Node Size is set to SAS (Step S26). Since this is not the final child node of the root node (No, Step S18), the process proceeds to Step S14. Since there are additional nodes on this branch of level 2 (Yes, Step S14), the process proceeds to Step S10 and node AC is examined. Node AC has children (Yes, Step S6). Accordingly, the "level" is incremented to level 3 (Step S8), and node ACA is examined. Node ACA has no children (No, Step S6). Accordingly, the Node Size of node ACA is set to its CNS (Step S12). Since there are no additional nodes oil this branch of level.3 (No, Step S14), the level is decremented to level 2(Step S16) and AC's Node Size is determined (Steps S20-S26). That is, the sum of Node Sizes of AC's child nodes is calculated (Step S20). In this case, CNS is greater than SAS (No, Step S22). Accordingly, AC's Node Size is set to its CNS (Step S24). Since node AC is not the final child node of the root node (No, Step S18), a determination is made whether there any additional nodes on this branch of level 2 (Step S14). In this case, there are no additional nodes on this branch of level 2 (No, Step S14). Accordingly, the level is decremented to level 1 (Step S16). The process then proceeds to Step S20 where the sum of Node Sizes of node A's child nodes are calculated. The sum will be the sum of AA's, AB's and AC's Node Sizes. Node A's CNS was determined earlier. In this case, SAS is greater than CNS (Yes, Step S22). Accordingly, node A's Node Size is set to SAS. Since this is not the final child node of the root node (No, Step S18) and there are additional nodes on level 1 (Yes, Step S14), node B is examined (Step S10).

Node B has children (Yes, Step S6). Accordingly, level is incremented to level 2 (Step S8). Node BA has children (Yes, Step S6) and, accordingly, the level is incremented to level 3 (Step S8). Node BAA has no children (No, Step S6). Node BAA's Node Size is thus set to its CNS (Step S12). Since there are additional nodes on level 3 (Yes, Step S14) node BAB is next examined (Step S10). Node BAB has no children (No, Step S6). Node BAB's Node Size is thus set to its CNS (Step S12). There are additional nodes on level 3 (Yes, Step S14). Accordingly, node BAC is next examined (Step S10). Node BAC has no children (No, Step S6) and thus, node BAC's Node Size is set to its CNS (Step S12). There are no additional nodes on this branch of level 3 (No, Step S14). Accordingly, level is decremented to level 2 (Step S16). The sum of Node Sizes of node BA's child nodes is then calculated (Step S20). In this case, SAS is greater then BA's CNS (Yes, Step S22). Accordingly, BA's Node Size is set to SAS. Since this is not the last child node of the root node (No, Step S18) and since there are additional nodes on this branch of level 2 (Yes, Step S14), node BB is next examined (Step S10).

Node BB has children (Yes, Step S6). Accordingly, the level is incremented (Step S8) to level 3. It is then determined whether node BBA has any children (Step S6). Since node BBA has no children (No, Step S6), its Node Size is set to its CNS (Step S12). Since there are additional nodes on this branch of level 3 (Yes, Step S14), node BBB is next examined (Step S10). Node BBB has no children (No, Step S6). Node BBB's Node Size is thus set to its CNS (Step S12). There are no additional nodes on this branch of level 3 (No, Step S14). Accordingly, the level is decremented (Step S16) to level 2. The sum of node sizes of BB's children nodes is then determined (Step S20). In this case, SAS is greater than B's CNS. Accordingly, B's Node Size is set to SAS (Step S26). Since this is not the last child node of the root node (No, Step S18), it is determined if there are any additional nodes on level 2. In this case, there are none (No, Step S14) and, accordingly, level is decremented to level 1 (Step S16) and the Node Size of node B is determined (Steps S20-S26). In this case, SAS is greater than node B's CNS (Yes, Step S22). Accordingly, node B's Node Size is set to SAS (Step S26).

This is not the last child node of the root node (No, Step S18) and since there are additional nodes on level 1 (Yes, Step S14), the next node (node C) is examined (Step S10). Node C has children (Yes, Step S6). Accordingly, the level is incremented (Step S8) to level 2. Since node CA has no children (No, Step S6), its Node Size is set to CNS (Step S12). Since there are additional nodes on this branch of level 2 (Yes, Step S14), node CB is next examined (Step S10). Node CB has no children (No, Step S6). Node CB's Node Size is thus set to its CNS (Step S12). There are no additional nodes on this branch of level 2 (No, Step S14).

Accordingly, the level is decremented (Step S16) to level 1. In Step S20, the sum of Node Sizes of node C's child nodes (SAS) is calculated (Step S20). In this case, the SAS is greater than C's CNS (Yes, Step S22). Accordingly, C's Node Size is set to SAS (Step S26). Since this is the final child node of the root node (Yes, Step S18), the process proceeds to Step S28 where the node sizes of the child nodes of the root node are added. This value is the Tree Size. Now, the angular sizes for each node can be determined using Formula (7) (Step S30) and the nodes may be drawn (Step S32).

In order to gather the information for generating the fantree, the present system and method can upload data from a database. This can be done through an appropriate Java Data Base Connectivity (JDBC) interface for the intended database system. The present system and method can be arranged in modules for accomplishing the tasks for painting or drawing the fantree. For example, a FanTree module may be used to gather information including the size of the tree (and each node), the level of the nodes, the node position and the children of each node. The FanTree module may also distribute information to the nodes about themselves. Such data might include the status of the nodes or the position where the nodes are displayed, etc.

A TreeNode module may describe a node of a tree structure. The TreeNode module may hold a series of children nodes and names. The TreeNode module may include functions for adding, finding and removing children.

Another embodiment of the present disclosure is referred to as a radar tree. The radar tree consists of a radial hierarchical fantree having expandable/implodable nodes as described above. The fan tree is swept by radar-like display, which updates the states of the visible nodes.

According to this embodiment, a process is run that enables a continual rotation. The radar continuously paints a fan of arcs forming a rotating enlightenment. This effect will be brightest at the directional end and then fades backward into the dark background. As it rotates, it will update events in the tree as the brightest end travels across its nodes.

Figure 9:
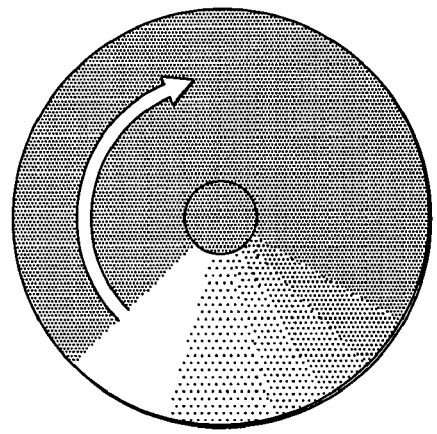
FIG. 9 is a diagram showing a radar fantree according to an embodiment of the present disclosure.

As shown in FIG. 9, a sequence of arcs is drawn for each cycle, each having a darker color than the previous arc. For each cycle, this arc sequence moves a fixed number of degrees clockwise. Each arc will span a fixed number of degrees, and there is no space between the arcs in the sequence. Any changed portion of the screen is calculated and redrawn for all iterations of the process, and the screen is updated accordingly when the radar reaches that portion of the screen. The fantree is eventually redrawn on each run or sweep of the radar.

According to an embodiment of the present disclosure, a user may manipulate the actions of the components of the tree by clicking a node. For example, when left-clicking a node, the node expands (if it has subnodes) altering the tree to fit the full circle by calculating the new positions as described above as necessary. When right-clicking a node, a popup menu appears, enabling the user to select from a set of options related to the node.

It will be appreciated that although the described embodiments relate to tree structures, the present disclosure may be equally applicable to other types of structures including, for example, other graph type structures in general.

The present disclosure may be conveniently implemented using one or more conventional general purpose digital computers and/or servers programmed according to the teachings of the present specification. Appropriate software coding can readily be prepared by skilled programmers based on the teachings of the present disclosure. The present disclosure may also be implemented by the preparation of application specific integrated circuits or by interconnecting an appropriate network of conventional component circuits.

Numerous additional modifications and variations of the present disclosure are possible in view of the above-teachings. It is therefore to be understood that within the scope of the appended claims, the present disclosure may be practiced other than as specifically described herein.

What is claimed is:

1. A method of visualizing a node-link structure, comprising:
   determining, using a processor, a radius for at least one level of a circular tree;
   obtaining data identifying a first node within the node-link structure;
   determining a first position of the first node, the first position being a center of the circular tree, wherein the radius of the at least one level is measured from the center of the circular tree, the radius of each level is found by subtracting a fraction from 1, and the fraction is a value less than one that decreases toward zero when there is an increase in level, wherein the fraction decreases logarithmically as a function of a number of levels in the tree and a number of the level for which the radius is being determined;
   determining positions of any children nodes of the first node and drawing the children nodes on a first level of the at least one level of the circular tree along the determined radius; and
   generating a display of the node-link structure on a display unit.

2. A method as recited in claim 1, further comprising:
   determining positions of any grand children nodes; and
   drawing the grand children nodes on a second level of the circular tree, wherein a radius of the second level is greater than a radius of the first level.

3. A method of visualizing a node-link structure, comprising:

determining, using a processor, a radius for at least one level of a circular tree;

obtaining data identifying a first node within the node-link structure;

determining a first position of the first node, the first position being a center of the circular tree, wherein the radius of the at least one level is measured from the center of the circular tree, the radius of each level is found by subtracting a fraction from 1, and the fraction is a value less than one that decreases toward zero when there is an increase in level, wherein the fraction is found by the equation $(1/(1+2/H))^L$, where H is a number of levels in the tree and L is the number of the level for which the radius is being determined;

determining positions of any children nodes of the first node and drawing the children nodes on a first level of the at least one level of the circular tree along the determined radius; and generating a display of the node-link structure on a display unit.

4. A method as recited in claim 1, wherein each node has a calculated node size (CNS) that determines a relative distance from a given node to its sibling node.

5. A method as recited in claim 4, wherein the calculated node size of a given node is determined by the equation $1/(1-(1/(1+2/H))^L)$, where H is a number of levels in the tree and L is a number of a level on which the given node is located.

6. A method as recited in claim 5, wherein after the calculated node size of each node is determined, a sum of the node sizes of a node's child nodes (SAS) is determined.

7. A method as recited in claim 6, wherein the sum of the node sizes of the node's children nodes is compared with the node's calculated node size to determine the. node's actual node size, wherein the actual node size comprises (MAX (CNS, SAS)).

8. A method as recited in claim 7, wherein a treesize is calculated by adding the actual node sizes of the children nodes of the root node.

9. A method as recited in claim 1, wherein an angular size of each node is calculated using the formula 2*PI*nodesize/treesize.

10. A method as recited in claim 1, the first node is a root node and wherein the first node is drawn at the first position.

11. A method as recited in claim 1, wherein nodes are drawn as circles, with nodes on different levels of the tree having different circumferences.

12. A computer recording medium including computer executable code for visualizing a node-link structure, comprising:

code for determining a radius for at least one level of a circular tree;

code for obtaining data identifying a first node within the node-link structure;

code for determining a first position of the first node, the first position being a center of the circular tree, wherein the radius of the at least one level is measured from the center of the circular tree, the radius of each level is found by subtracting a fraction from 1, and the fraction is a value less than one that decreases toward zero when there is an increase in level, wherein the fraction decreases logarithmically as a function of a number of levels in the tree and a number of the level for which the radius is being determined; and code for determining positions of any children nodes of the first node and drawing the children nodes on a first level of the at least one level of the circular tree along the determined radius.

13. A computer recording medium as recited in claim 12, further comprising:

code for determining positions of any grand children nodes; and code for drawing the grand children nodes on a second level of the circular tree, wherein a radius of the second level is greater than a radius of the first level.

14. A computer recording medium including computer executable code for visualizing a node-link structure, comprising:

code for determining a radius for at least one level of a circular tree;

code for obtaining data identifying a first node within the node-link structure;

code for determining a first position of the first node, the first position being a center of the circular tree, wherein the radius of the at least one level is measured from the center of the circular tree, the radius of each level is found by subtracting a fraction from 1, and the fraction is a value less than one that decreases toward zero when there is an increase in level, wherein the fraction is found by the equation $(1/(1+2/H))^L$, where H is a number of levels in the tree and L is the number of the level for which the radius is being determined; and code for determining positions of any children nodes of the first node and drawing the children nodes on a first level of the at least one level of the circular tree along the determined radius.

15. A computer recording medium as recited in claim 12, wherein each node has a calculated node size (CNS) that determines a relative distance from a given node to its sibling node.

16. A computer recording medium as recited in claim 15, wherein the calculated node size of a given node is determined by the equation $(1/(1+2/H))^L$, where H is a number of levels in the tree and L is a number of a level on which the given node is located.

17. A computer recording medium as recited in claim 16, wherein after the calculated node size of each node is determined, a sum of the node sizes of a node's child nodes (SAS) is determined.

18. A computer recording medium as recited in claim 17, wherein the sum of the node sizes of the node's children nodes is compared with the node's calculated node size to determine the node's actual node size, wherein the actual node size comprises (MAX (CNS, SAS)).

19. A computer recording medium as recited in claim 18, wherein a treesize is calculated by adding the actual node sizes of the children nodes of the root node.

20. A computer recording medium as recited in claim 12, wherein an angular size of each node is calculated using the formula 2*PI*nodesize/treesize.

21. A computer recording medium as recited in claim 12, the first node is a root node and wherein the first node is drawn at the first position.

22. A computer recording medium as recited in claim 12, wherein nodes are drawn as circles, with nodes on different levels of the tree having different circumferences.

23. An apparatus for visualizing a node-link structure, comprising:

a system for obtaining data identifying a first node within the node-link structure; and a processor for determining a radius for at least ore level of a circular tree, the processor determining a first position of the first node, the first position being a center of the circular tree, wherein the radius of the at least one level is measured from the center of the circular tree, the radius of each level is found by subtracting a fraction from 1, the fraction is a value less than one that decreases toward zero when there is an increase in level, the fraction decreases logarithmically as a function of a number of levels in the tree and a number of the level for which the radius is being determined, and the processor determines positions of any children nodes of the first node and drawing the children nodes on a first level of the at least one level of the circular tree along the determined radius.

24. An apparatus as recited in claim 23, wherein the processor determines positions of any grand children nodes and draws the grand children nodes on a second level of the circular tree, wherein a radius of the second level is greater than a radius of the first level.

25. An apparatus for visualizing a node-link structure, comprising:
a system for obtaining data identifying a first node within the node-link structure; and
a processor for determining a radius for at least ore level of a circular tree, the processor determining a first position of the first node, the first position being a center of the circular tree, wherein the radius of the at least one level is measured from the center of the circular tree, the radius of each level is found by subtracting a fraction from 1, the fraction is a value less than one that decreases toward zero when there is an increase in level, wherein the fraction is found by the equation $(1/(1+2/H))^L$, where H is a number of levels in the tree and L is a level for which the radius is being determined; and the processor determines positions of any children nodes of the first node and drawing the children nodes on a first level of the at least one level of the circular tree along the determined radius.

26. An apparatus as recited in claim 23, wherein each node has a calculated node size (CNS) that determines a relative distance from a given node to its sibling node.

27. An apparatus as recited in claim 26, wherein a calculated node size of a given node is determined by the equation $1/(1-(1/(1+2/H))^L)$, where H is a number of levels in the tree and L is a number of a level on which the given node is located.

28. An apparatus as recited in claim 27, wherein after the calculated node size of each node is determined, a sum of the node sizes of a node's child nodes (SAS) is determined prior to drawing a sibling node of the given node, any children nodes of the given node are traversed to determine angular sizes of the children nodes of the given node.

29. An apparatus as recited in claim 28; wherein the sum of the node sizes of the node's children is compared with the node's calculated node size to determine the node's actual node size, wherein the actual node size comprises (MAX (CNS, SAS)).

30. An apparatus as recited in claim 23, wherein a tree size is calculated by adding the actual node sizes of the children nodes of the root node.

31. An apparatus as recited in claim 27, wherein an angular size of each node is calculated using the formula 2*PI*nodesize/treesize.

32. An apparatus as recited in claim 23, wherein the first node is a root node and wherein the first node is drawn at the first position.

33. An apparatus as recited in claim 23, wherein nodes are drawn as circles, with nodes on different levels of the tree having different circumferences.

34. The method of claim 1, further comprising:
printing the node-link structure on a printer.

35. A computer recording medium as recited in claim 12, further comprising:
code for printing the node-link structure on a printer.

36. An apparatus as recited in claim 23, wherein the processor is operable to print the node-link structure on a printer.

* * * * *